F. TRIGALET.
Improvement in Cultivators.
No. 132,504. Patented Oct. 22, 1872.
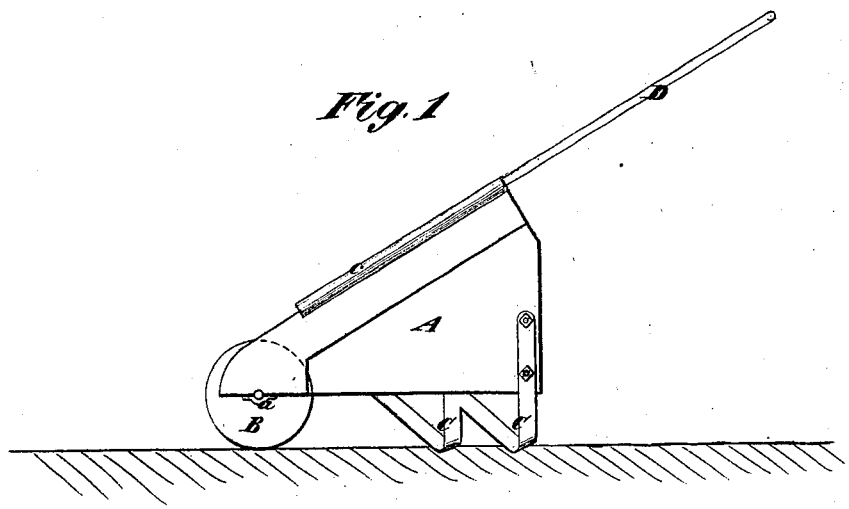
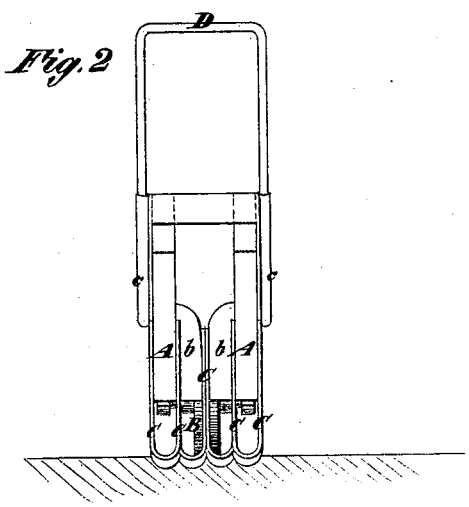
Witnesses.
Fred Haynes
R. I. Rabeau
Inventor.
Frederic Trigalet

UNITED STATES PATENT OFFICE.

FREDERIC TRIGALET, OF ASTORIA, NEW YORK.

IMPROVEMENT IN CULTIVATORS.

Specification forming part of Letters Patent No. 132,504, dated October 22, 1872.

*To all whom it may concern:*

Be it known that I, FREDERIC TRIGALET, of Astoria, in the county of Queens and State of New York, have invented a new and Improved Cultivator; and I do hereby declare that the following is a full, clear, and exact description thereof, reference being had to the accompanying drawing forming a part of this specification.

The object of this invention is to produce a cultivator which will more perfectly pulverize the earth and destroy the weeds, and which will require less power to operate it than those now in use. To this end, it consists in a cultivator provided with a series of U-shaped blades, arranged so that the rounded bottom portions enter the earth and their vertical cutting portions are in such relation with each other that they effectually break up the whole surface of the earth passed over, and with much less resistance than the ordinary teeth or blades.

In the accompanying drawing, Figure 1 is a side view of a cultivator made according to my invention, and Fig. 2 is a back view of the same.

Similar letters of reference indicate corresponding parts in both figures.

The cultivator represented is to be operated by hand-power; but they are made in larger sizes to be drawn by horses. Its frame consists of two side pieces, A A, secured together by stretchers and braces. The forward portion has a wheel, B, secured to it by bearings $a\ a$. C C are the cutters of the cultivator. The cutters for each side of the machine are made of a strip of steel plate, which resembles a series of alternately erect and inclined cutting-edges in the direction of their travel. Each strip is bolted or otherwise firmly secured at one end to the outer side of the rear portion of one of the side pieces A A of the cultivator, and the point of the V is secured to the middle portion of the inner side of said side piece, and at the other end of the strip is secured in contact with the end of the opposite strip between two strips or cleats, $b\ b$, on the forward part of the inner sides of the side pieces. D is a handle, which is secured in sockets $c\ c$ on the side pieces A A of the cultivator.

The principal advantage of this cultivator is that the cutting-edges of the loop-shaped cutters are not in the same vertical or inclined plane transversely of the machine, but, being arranged alternately at different angles from the beam to which they are attached, cannot possibly be clogged by a stone or other obstacle raised by the lower cutting portion, as such would find a free exit to one or the other side of the cutters. This materially reduces the resistance and economizes the power required to draw them through the ground.

This cultivator is lighter than either the tooth-cultivator or single-blade cultivator, and therefore is easier to transport.

What I claim as my invention, and desire to secure by Letters Patent, is—

A cultivator having a series of U-shaped blades or cutters, the limbs of each of which are arranged at different angles to each other on the line of travel, substantially as shown and described, for the purpose set forth.

FREDERIC TRIGALET.

Witnesses:
FRED. HAYNES,
R. E. RABEAU.